US006791784B2

(12) United States Patent
Edwards (10) Patent No.: US 6,791,784 B2
(45) Date of Patent: Sep. 14, 2004

(54) DIFFRACTION-BASED MONITORING OF A PATTERNED MAGNETIC RECORDING MEDIUM

(75) Inventor: Jathan D. Edwards, Afton, MN (US)

(73) Assignee: Imation Corp., Oakdale, MN (US)

( * ) Notice: Subject to any disclaimer, the term of this patent is extended or adjusted under 35 U.S.C. 154(b) by 266 days.

(21) Appl. No.: 09/816,893

(22) Filed: Mar. 23, 2001

(65) Prior Publication Data

US 2002/0135929 A1 Sep. 26, 2002

(51) Int. Cl.[7] .............................................. G11B 5/596
(52) U.S. Cl. ............................ 360/77.03; 360/678.11; 360/78.02
(58) Field of Search .............................. 360/77.03, 51, 360/77.12, 78.11; 369/32, 44, 44.11, 13.28; 216/65

(56) References Cited

U.S. PATENT DOCUMENTS

| | | | |
|---|---|---|---|
| 3,426,337 A | * | 2/1969 | Black et al. ............. 360/77.03 |
| 4,843,494 A | * | 6/1989 | Cronin et al. ............ 360/77.03 |
| 4,958,245 A | * | 9/1990 | Roth et al. ............... 360/77.03 |
| 4,961,123 A | * | 10/1990 | Williams et al. ............ 360/131 |
| 5,120,927 A | | 6/1992 | Williams et al. |
| 5,210,672 A | | 5/1993 | Ivers et al. |
| 5,279,775 A | | 1/1994 | Thomas et al. |
| 5,283,773 A | | 2/1994 | Thomas et al. |
| 5,322,987 A | | 6/1994 | Thomas et al. |
| 5,339,204 A | * | 8/1994 | James et al. .................. 360/51 |
| 5,511,050 A | * | 4/1996 | Matsumoto et al. ..... 369/44.23 |
| 5,535,069 A | | 7/1996 | Chiao et al. |
| 5,576,918 A | | 11/1996 | Bar-Gadda et al. |
| 5,909,333 A | * | 6/1999 | Best et al. ..................... 360/51 |
| 6,084,740 A | * | 7/2000 | Leonhardt et al. ....... 360/78.02 |
| 6,365,061 B1 | * | 4/2002 | Damer et al. ................. 216/65 |

* cited by examiner

Primary Examiner—David Hudspeth
Assistant Examiner—K. Wong
(74) Attorney, Agent, or Firm—Eric D. Levinson (57) ABSTRACT

The diffraction-based monitoring techniques described herein can be used, for example, as quality assurance measure in manufacture of magnetic recording media with servo tracking. In one embodiment, the invention presents a system comprising a light source such as a laser that directs light upon a surface of a magnetic recording medium. The magnetic recording medium has two or more physical marks, and the light striking the magnetic recording medium produces a diffraction pattern. A light detector such as a photodiode detects some or all of the diffraction pattern. The physical marks may be servo tracks on the magnetic recording medium, and the detected diffraction pattern is a function of the characteristics of the servo tracks.

37 Claims, 7 Drawing Sheets

DIFFRACTION-BASED MONITORING OF A PATTERNED MAGNETIC RECORDING MEDIUM

TECHNICAL FIELD

The invention relates to data storage media and, more particularly, to techniques for monitoring servo tracks in magnetic media.

BACKGROUND

Magnetic media are used for storage and retrieval of data, and come in many forms, such as magnetic tape and magnetic disks. A write/read head assembly, which includes one or more write/read transducer heads, reads data from and writes data to the magnetic medium. The data stored on the medium are usually organized into "data tracks," and the transducer heads write data to and read data from the data tracks.

Data tracks on magnetic tape are generally parallel to each other, and often are oriented longitudinally on the tape. The head assembly is usually oriented transverse to the path of the magnetic tape so that the transducer heads move laterally across the width of the tape to access the tracks. On a magnetic disk, the data tracks are generally arranged as concentric circles or a spiral pattern on the disk, and the head assembly typically moves along a radius of the disk to access the tracks.

For efficient reading and writing, a transducer head must be accurately positioned to read from or write to a particular data track. A servo control loop typically is provided to control the positioning of the head relative to the data tracks. The medium often includes specialized tracks, called "servo tracks," to serve as references or landmarks for the servo. Data tracks can be located on the magnetic medium according to the data tracks' displacement from one or more servo tracks. Servo tracks may include magnetic markers, in which case the surface of the medium is homogeneous but the servo track can be detected magnetically. Another type of servo track is a physical mark on the medium, such as a groove. With this type of servo track, the medium surface is not homogeneous but is physically altered at the site of the servo track. Servo tracks of the latter type can be detected optically.

SUMMARY

The invention is directed to diffraction-based monitoring of a magnetic recording medium to verify the formation of servo tracks. A diffraction-based monitoring technique can be used, for example, as quality assurance measure in manufacture of magnetic media with servo tracking.

A "servowriter" is a device that is configured to form physical servo tracks on a magnetic medium. One way to make a physical servo track on a magnetic medium is to ablate the medium with a laser. A laser can mark very fine servo tracks, a few microns in width, in the medium and can do so with good accuracy and precision. It is important, however, to be able to inspect the magnetic medium after marking to evaluate whether the servo tracks formed by the laser meet applicable quality standards. Quality standards may govern, for example, the spacing between servo tracks or the depth or shape of the tracks. In addition, it may be useful to monitor the process of placing servo tracks by laser while servo tracks are being formed so that improperly formed servo tracks may be detected and so that corrections may be made during manufacture of the medium.

The invention provides high-speed techniques for monitoring servo tracks that physically alter the recording medium. If the tracks are periodic, then directing a beam of coherent light on the medium will generate a reflected diffraction pattern. By monitoring the diffraction pattern created by the servo tracks, the characteristics, and therefore the quality, of the servo tracks can be evaluated. In one embodiment, the invention presents a system comprising a light source such as a laser that directs light upon two or more physical marks on a surface of a magnetic recording medium. The physical marks may be servo tracks, and light striking the surface of the medium produces a diffraction pattern. A light detector such as a photodiode detects at least a portion of the diffraction pattern. The detector may generate a signal as a function of the part of the diffraction pattern detected by the detector. The apparatus may be configured to monitor one or more diffractive orders of the diffraction pattern.

In another embodiment, the invention presents a method, comprising illuminating a surface of a magnetic recording medium. The medium has two or more physical marks such as servo tracks, and illuminating the medium generates a diffraction pattern. The method further includes detecting at least part of the diffraction pattern. In addition, a signal may be generated as a function of the detected diffraction pattern.

In a further embodiment, the invention presents a method comprising forming servo tracks on magnetic media, illuminating a region of the magnetic media to generate a diffraction pattern, detecting at least part of the diffraction pattern, generating a signal as a function of the detected diffraction pattern and forming subsequent servo tracks on the magnetic media as a function of the signal. This method allows the diffraction pattern to operate as part of a feedback system in the process of marking servo tracks.

In an additional embodiment, the invention presents a system that implements a feedback system. The apparatus includes a marking device configured to form servo tracks on magnetic media, a light source configured to direct light upon the media and generate a diffraction pattern and a light detector configured to detect at least part of the diffraction pattern, and to generate a signal as a function of the detected diffraction pattern. The marking device is configured to form subsequent servo tracks on the magnetic media as a function of the signal.

In another embodiment, the invention presents a method, comprising illuminating a surface of a magnetic recording medium to generate a diffraction pattern, detecting at least part of the diffraction pattern and generating a signal as a function of the detected diffraction pattern. The diffraction pattern can result from servo tracks on the medium, and the signal can be a function of various characteristics of the servo tracks.

The details of one or more embodiments of the present invention are set forth in the accompanying drawings and the description below. Other features, objects, and advantages of the present invention will be apparent from the description and drawings, and from the claims.

DETAILED DESCRIPTION

Figure 1:
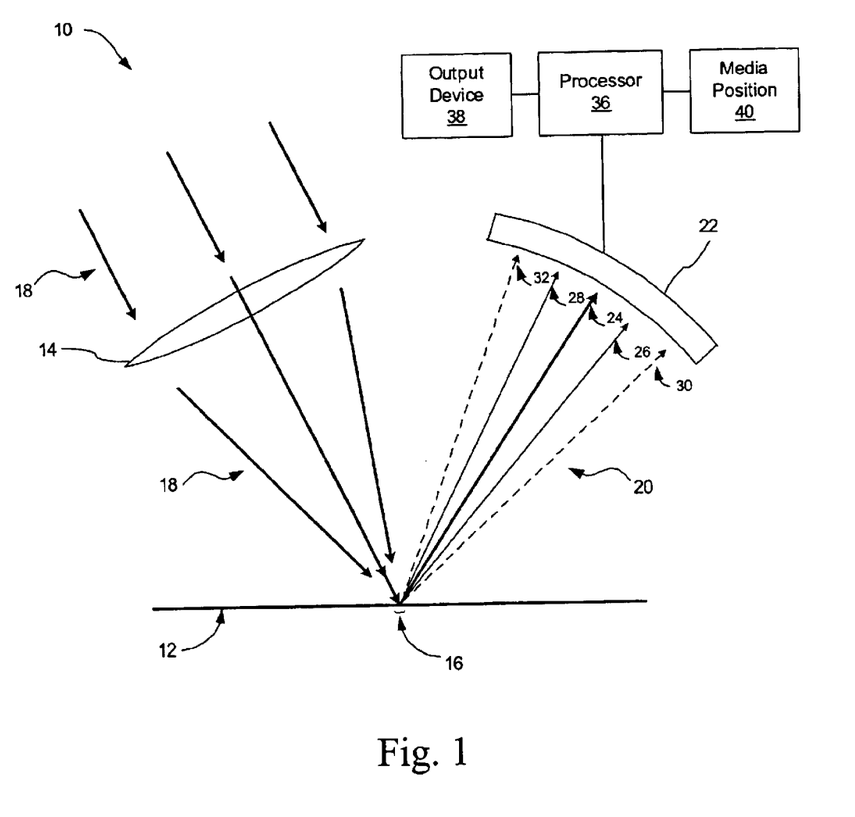
FIG. 1 is a diagram illustrating generation and detection of a diffraction pattern reflected from a magnetic recording medium.

FIG. 1 illustrates a system 10 for generating and detecting a diffraction pattern for use in monitoring servo tracks on magnetic medium 12. The diffraction pattern results from incident light 18 being reflected from magnetic medium 12, as indicated by reference numeral 20. Magnetic medium 12 may take the form of a magnetic tape or disk, and includes periodically spaced marks that physically alter the surface of medium 12. For purposes of the following discussion, it will be assumed that the periodically spaced marks function as servo tracks, although the invention is not limited to use in monitoring servo tracks.

A source such as a laser (not shown in FIG. 1) provides incident light 18, which is preferably coherent and monochromatic. The resulting diffraction pattern depends in part upon the wavelength of the light. For many purposes, a HeNe laser (a typical low-power laser with a wavelength of 633 nm) generates an adequate diffraction pattern. Other light sources, such as semiconductor lasers, may also produce good results. Incident light 18 is directed by an optical device such as lens 14 to small illuminated region 16 on medium 12. Medium 12 may be substantially opaque, and reflects a fraction of incident light 18. Servo tracks in illuminated region 16 function as rulings in a diffraction grating, generating a diffraction pattern from reflected light 20. Detector 22 detects some or all of reflected light 20, including some or all of the diffraction pattern.

The diffraction pattern results from constructive and destructive interference of the coherent, monochromatic light reflected from medium 12. In the absence of servo tracks, no usable diffraction pattern forms. When the surface of medium 12 is interrupted by periodic servo tracks, however, a diffraction pattern may be observed with intensity peaks corresponding to angles of constructive interference. The bright regions are called the "maxima" of the diffraction pattern, and the intervening dark regions are called the "minima." The characteristics of the diffraction pattern can be detected and measured by detector 22, including the intensity of the light within a particular maxima, the ratios of intensity of particular maxima and the spacing between maxima. Reflected light that does not diffract typically generates a very bright maximum, or "central maximum" 24. Maxima are identified with diffractive orders. Central maximum 24 is sometimes called the "zero-order maximum." The maxima adjacent on either side of central maximum 24 are called "first-order" maxima, with higher diffractive orders being further displaced from central maximum 24. The spacing between maxima is usually measured with respect to the angular separation of the maximum from central maximum 24. In FIG. 1, two first-order maxima 26 and 28 are shown on either side of central maximum 24, and two fainter second-order maxima 30 and 32 are also shown. Reflected light 20 may include higher orders of maxima or include other low-intensity maxima not shown in FIG. 1.

The characteristics of the diffraction pattern are functions of the wavelength of the light, the distance between servo tracks, the width of the servo tracks, the shape of the servo tracks and the number of servo tracks in the illuminated region 16 of medium 12. The wavelength of incident light 18 is determined by the choice of laser. By controlling the size of illuminated region 16 and by observing the resulting diffraction pattern, it is possible to observe and measure physical characteristics of the servo tracks, including the concentration of servo tracks in illuminated region 16, the distance between servo tracks and the average width and/or depth of the group of servo tracks being sampled. Consequently, analysis of the diffraction pattern can provide a useful tool for quality assurance in the manufacture of a magnetic recording medium with servo tracking.

Incident light 18 is generally directed to a small section of medium 12, so illuminated region 16 ordinarily will be substantially smaller than the total surface area of medium 12. To observe diffraction patterns generated by different sections of medium 12, medium 12 may be scanned by system 10. In other words, medium 12 may be moved or transported relative to system 10, causing different sections of medium 12 to become illuminated and possibly to generate different diffraction patterns. The transporting mechanism may depend upon the conformation of the medium. If medium 12 comprises magnetic tape, for example, the tape may be fed from a dispensing reel (not shown in FIG. 1), scanned by system 10 and taken up by a take-up reel (not shown in FIG. 1). If medium 12 comprises a magnetic disk, the disk may rotate on a spindle (not shown in FIG. 1) relative to system 10. A transporting mechanism may also move system 10 relative to medium 12 to illuminate different sections of medium 12. By placing system 10 and/or medium 12 in motion, different sections of medium 12 can be scanned, and the diffraction pattern generated by illuminated region 16 may change. The entire surface area of medium 12 may be scanned, or scanning may be limited to selected sections. Changes in the characteristics of the servo tracks along the scanned surface area of medium 12 may be observed and monitored by observing and monitoring changes in the diffraction pattern. Observation and monitoring of these characteristics may be performed by detector 22 without physically contacting medium 12.

Detector 22 may include a light-sensitive measuring instrument, such as a photodiode. A photodiode generates a current signal that depends upon the intensity of the light striking the photodiode. The current signal generated by the photodiode can be converted to another form of signal, such as an analog voltage signal or a digital signal. Detector 22 may also include an array of photodiodes, which may generate a plurality of signals. In FIG. 1, for example, detector 22 may include a bank of photodiodes to capture a wide arc of the diffraction pattern, rather than any particular maximum or maxima. Photodiodes respond quickly to changes in light intensity. Consequently, photodiodes are adapted to detect rapidly-occurring changes in the diffraction pattern as a different section of medium 12 moves through illuminated region 16. Medium 12 may therefore be scanned by system 10 at high speed.

Detector 22 may generate one or more signals as a function of the diffraction pattern. Signals from detector 22 may be received by processor 36. Processor 36 may, for example, measure the number of maxima, the intensities of maxima, the spacing of the maxima, and the general spread of the diffraction pattern, all based on the amplitude and/or frequency characteristics of the output signal generated by detector 22. In addition, processor 36 may receive a media position signal from a media position sensor 40. The media position signal allows processor to correlate the signals from detector 22 with a section of medium 12 being scanned. The media position signal may be derived from an open-loop or closed-loop position tracking system that monitors the position of detector 22 relative to medium 12, and calculates the media position signal for the section of the medium being scanned. Processor 36 may further generate one or more signals relating the detected diffraction pattern to the section of medium 12 being scanned. The signals may be received by output device 38, which may be configured to display the data received from processor 36 numerically, graphically or in a combination of formats.

Figure 2:
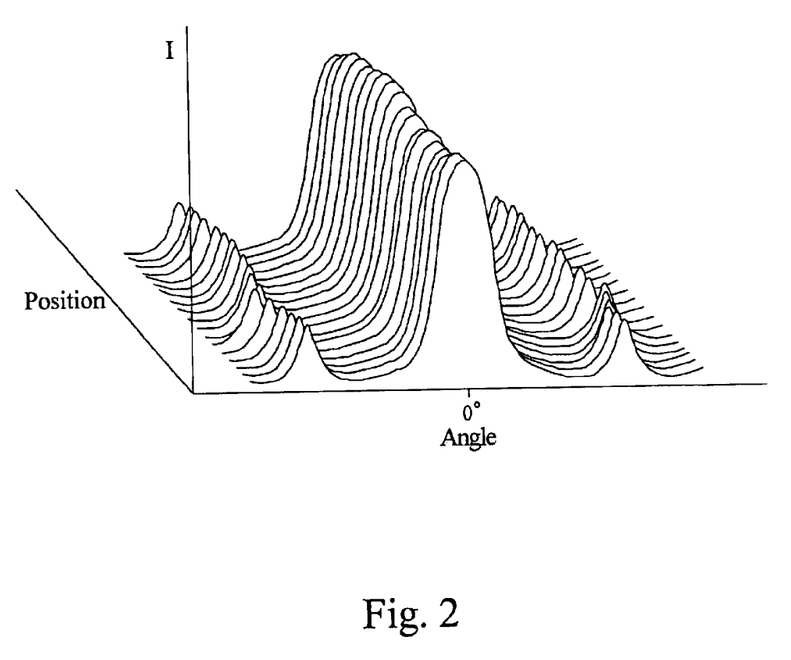
FIG. 2 is a graph of exemplary data from the system depicted in FIG. 1.

FIG. 2 illustrates one form of output from output device 38. The output data are in the form of a three-dimensional graph showing intensity (I) of the diffraction pattern as a function of the angular separation from the central maximum (0°) and as a function of position, i.e., the section of the medium being scanned. This format may be useful, for example, in detecting intensity fluctuations or spreading and narrowing of the diffraction pattern, which suggest a lack of uniformity among servo tracks. If significant lack of uniformity is detected, there may be a manufacturing quality issue that requires attention.

Returning to FIG. 1, the size of illuminated region 16 may vary from application to application. In general, a smaller illuminated region 16 results in a smaller sampling region, and consequently more time is needed to scan the surface area of medium 12. An advantage of a smaller sampling region, however, is that minute deviations in the servo tracks will manifest themselves more prominently in the diffraction pattern, where they may be detected. Using a larger illuminated region 16 may allow for faster scanning of medium 12, but may miss some of the more minute defects in the servo tracks.

The configuration of system 10 shown in FIG. 1 is exemplary, and the invention is not limited to the shown configuration. Various modifications may be made without departing from the scope of the claims. For example, transmitted light may be used in place of reflected light when the medium is substantially transparent. Incident light 18 may be directed with optical devices other than lens 14, such as mirrors or collimators.

Figure 3:
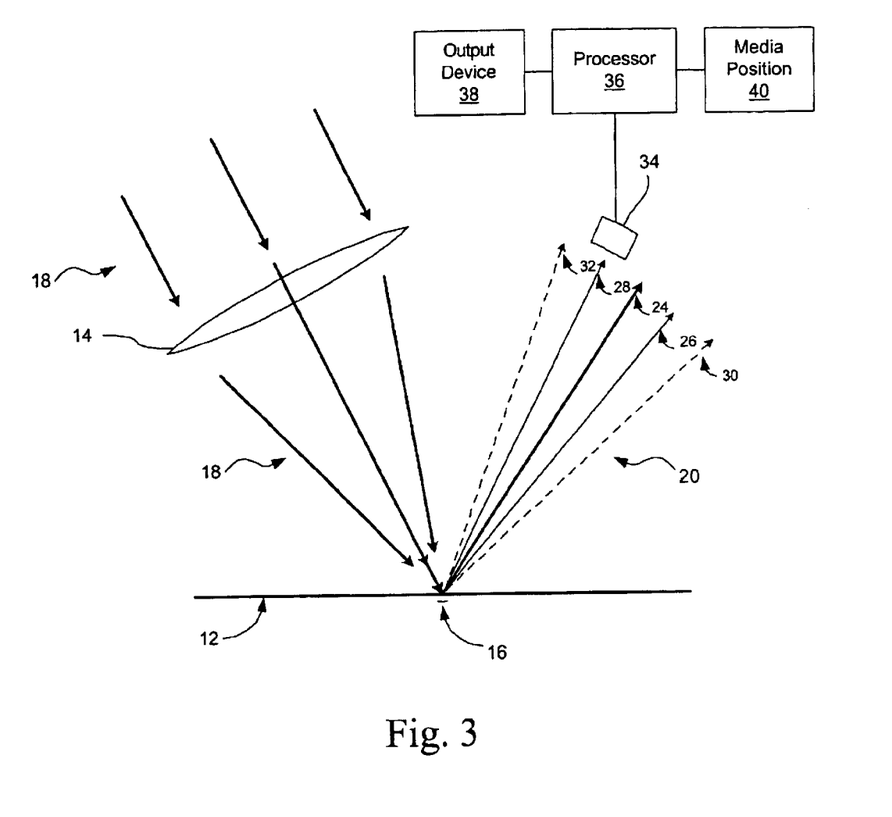
FIG. 3 is a diagram illustrating a system for detection of a diffraction pattern in accordance with an embodiment of the invention.

An alternate embodiment is depicted in FIG. 3, which is like FIG. 1 except that detector 34 is configured to measure a selected diffractive order. In particular, detector 34 monitors first-order maximum 28 and ignores other maxima. Detector 34 supplies an intensity signal, which is a function of the intensity of first-order maximum 28, to processor 36. In addition, processor 36 may receive media position signal from a media position sensor 40.

Processor 36 may, for example, compare the measured intensity of first-order maximum 28 with the ideal intensity that would be expected from servo tracks with particular characteristics. Such a comparison is useful for quality control, such as for verifying proper placement and configuration of servo tracks. Processor 36 may further supply the results of the comparison to output device 38. Output device 38 may be one or more of many output devices, such as a display monitor or printer. Output device 38 may be configured to display data received from processor 36 numerically, graphically or in a combination of formats.

Figure 4:
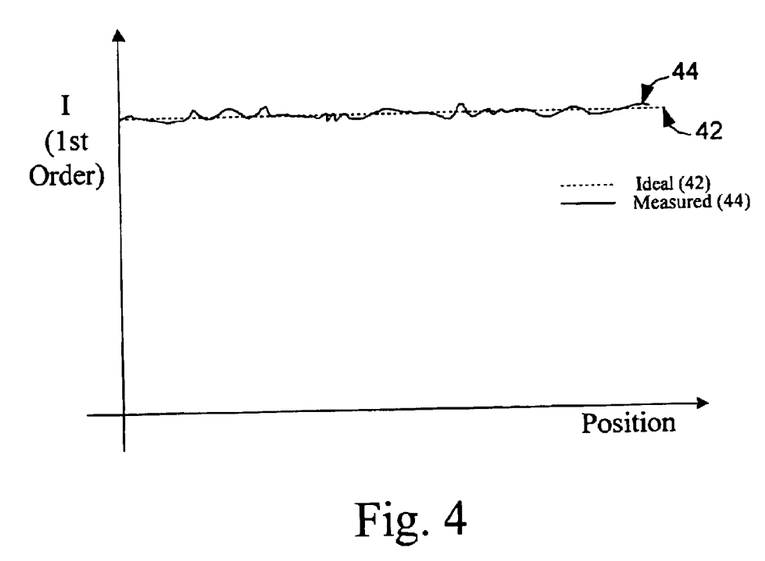
FIG. 4 is a graph of exemplary data from the system depicted in FIG. 3.

FIG. 4 illustrates some typical output data from output device 38. The output data are in the form of a graph showing intensity of the first-order maximum as a function of position, i.e., the section of the medium being scanned. Ideal data line 42 represents an expected intensity for servo tracks having desired characteristics, such as width and spacing. Ideal data line 42 assumes perfect consistency, with the same intensity expected for all positions. Measured data curve 44 represents the measured intensity at a range of positions. By comparing the measured intensity with the expected intensity, it can be determined whether the characteristics of the actual servo tracks on medium 12 deviate from the desired characteristics. Serious deviations from ideal may indicate a problem with the servo tracks, a problem with the medium, e.g., warping, or both.

Figure 5:
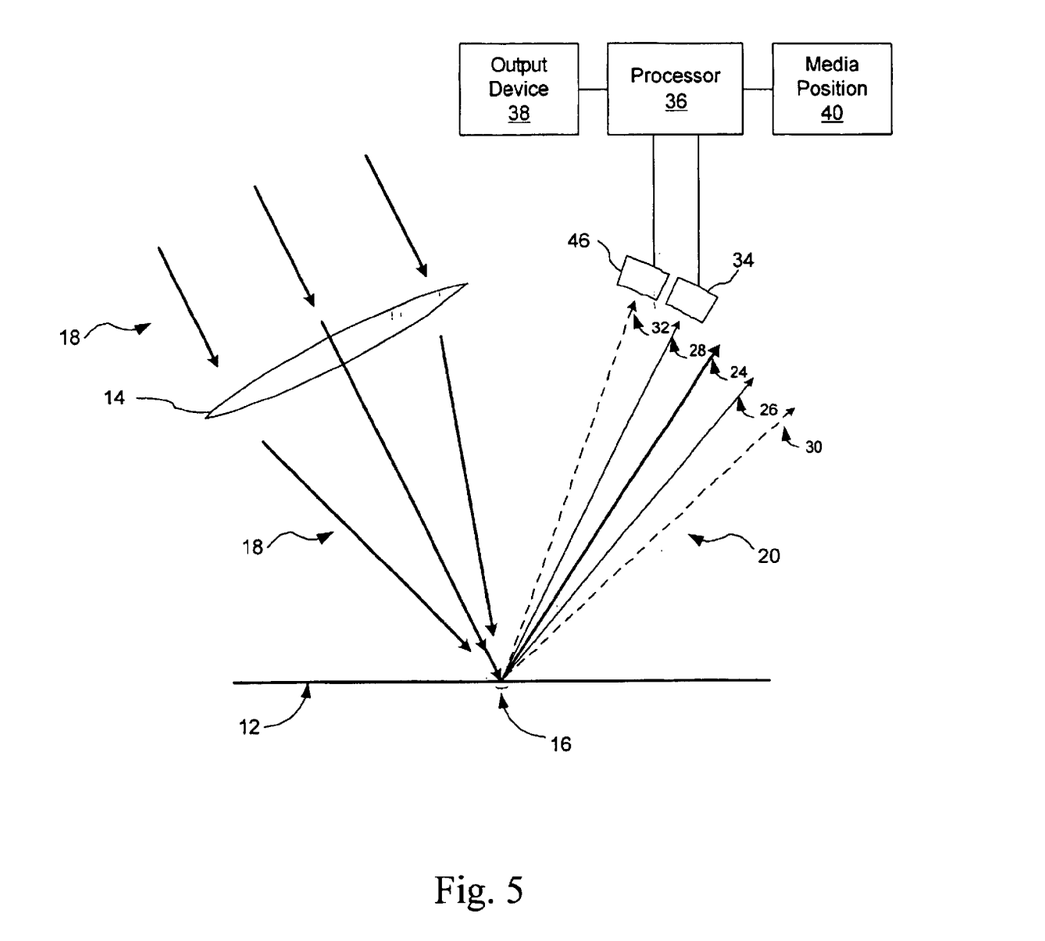
FIG. 5 is a diagram illustrating a system for detection of a diffraction pattern in accordance with an embodiment of the invention.

A further embodiment is shown in FIG. 5, which is like FIG. 3 except that a second detector 46 measures another diffractive order. Second detector 46 measures the intensity of second-order maximum 32 and ignores the other maxima. Detectors 34 and 46 each supply an intensity signals to processor 36. Processor 36 may then analyze the characteristics of the servo tracks on the basis of two measured maxima.

Figure 6:
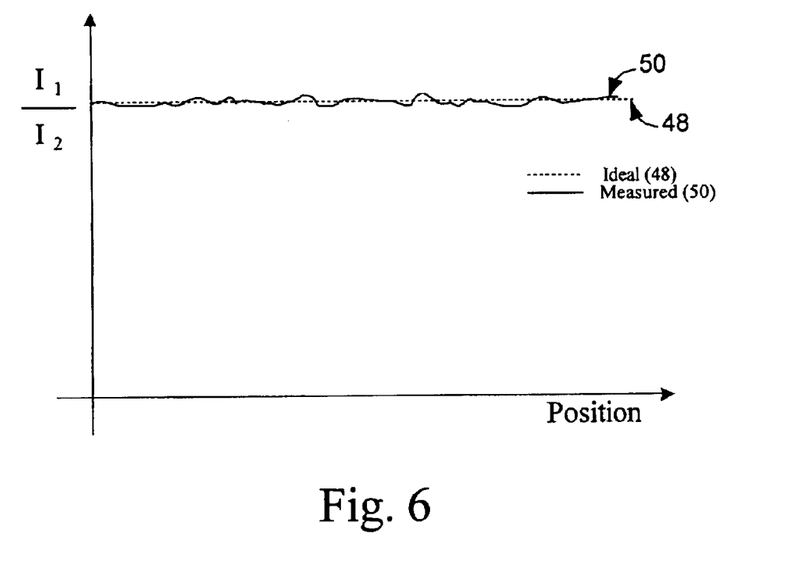
FIG. 6 is a graph of exemplary data from the system depicted in FIG. 5.

In some circumstances, the relative intensity of different orders of maxima can provide useful information, such as when the measurements are prone to anomalies such as intensity fluctuations of the light source or irregularities in the reflectivity of the medium. A ratio of intensities of different orders may also be useful to analyze the depth and width of the servo tracks. FIG. 6 illustrates some typical output data from output device 38, in which the ratio of the two intensities is plotted as a function of position. Ideal data line 48 represents an expected relative intensity for servo tracks having desired characteristics, and measured data curve 50 represents the measured relative intensity at a range of positions.

Returning to FIG. 5, simultaneous measurements of the intensities for two or more diffractive orders may be used to evaluate another characteristic of the servo tracks, in particular, the cross-sectional shape of the servo tracks. Different cross-sectional shapes generate different Fourier harmonics, resulting in different diffractive orders. Rounded servo tracks, for example, generate a relatively strong first diffracted order and small higher-order diffractions. When scanned, such servo tracks generate a prominent first-order maxima, with other maxima being faint. Other servo track shapes may be described, for example, by a prominent first and third diffracted order, and thus when scanned generate prominent first- and third-order maxima.

Figure 7:
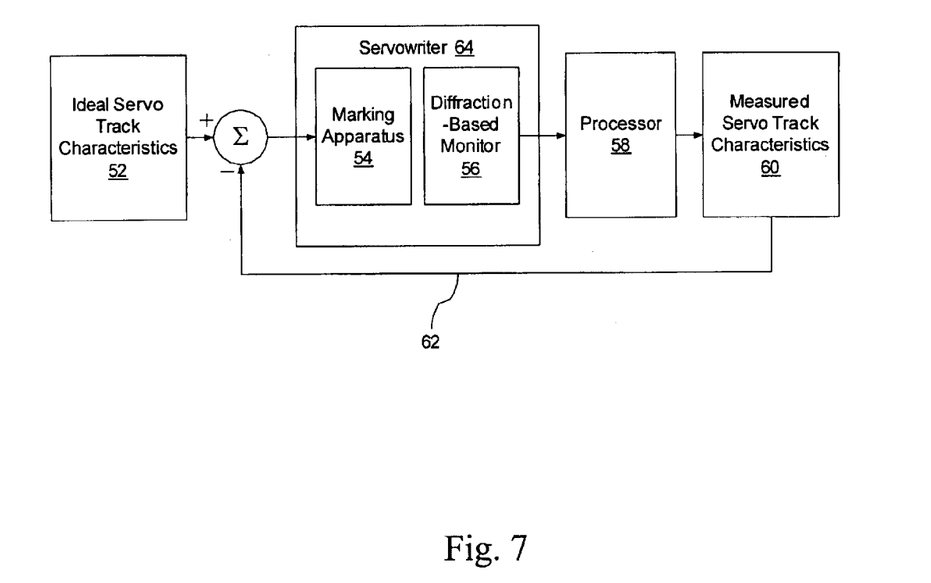
FIG. 7 is block diagram showing a feedback system in accordance with an embodiment of the invention.

Measurement of diffraction patterns may also be used as part of a process for marking servo tracks in a magnetic medium. FIG. 7 shows a feedback system in which diffraction pattern measurements are used to correct for errors in the marking process. Servowriter 64 includes marking apparatus 54, which may include a laser configured to ablate servo marks on the magnetic medium. Servowriter 64 also includes diffraction-based monitor 56. Marking apparatus 54 receives signals defining the ideal or desired servo track characteristics 52, such as spacing between the servo tracks, and marks servo tracks on the magnetic medium. In this context, "marking" refers to any process by which physical servo tracks are formed on magnetic media, and includes but is not limited to laser ablation.

The magnetic medium may be transported through servowriter 64 so that the medium may undergo marking by marking apparatus 54, followed by monitoring by diffraction-based monitor 56. Diffraction-based monitor 56 measures the actual servo track characteristics using the diffraction techniques described above. Diffraction-based monitor 56 may include, for example, the apparatus shown in FIG. 1, 3 or 5. Signals from diffraction-based monitor 56 are supplied to processor 58, which may use one or more techniques to verify that the servo tracks have the desired servo track characteristics. Processor 58 may, for example, calculate the servo track characteristics that would generate the measured diffraction pattern. Processor may also compare the measured diffraction characteristics with target diffraction characteristics, i.e., expected or ideal diffraction characteristics that have been derived mathematically or experimentally. Experimental derivation may comprise scanning a carefully manufactured prototype and recording the diffraction pattern generated by the prototype. Processor 58 may further generate a signal as a function of the measured servo track characteristics 60. Measured servo track characteristics 60 may be negatively fed back 62 to marking apparatus 54 to correct or adjust the marking conditions.

A number of embodiments of the invention have been described. The configurations of diffraction-based monitoring FIGS. 1, 3 and 5 are exemplary configurations, and the invention is not limited to the shown configurations. Similarly, the invention is not limited to the particular feedback configuration shown in FIG. 7. For example, diffraction-based monitor 56 may be separate from servowriter 64, or servowriter 64 may include processor 58. Various modifications may be made without departing from the scope of the following claims. For example, another embodiment may include monitoring multiple diffractive orders using a single detector, with the diffractive orders mirror-directed to interfere with each other. Multiple light sources of different wavelengths may be used simultaneously, producing multiple simultaneous diffraction patterns. Servo tracks on magnetic media other than tape and disk, such as drum, may be monitored using the techniques described above. These and other embodiments are within the scope of the following claims.

What is claimed is:

1. A system comprising:
    a light source that directs light upon at least two physical marks on a surface of a magnetic recording medium; and
    a light detector that detects at least a portion of a diffraction pattern comprising at least two diffractive orders produced by the light striking the surface of the magnetic recording medium.

2. The system of claim 1, wherein the diffraction pattern is generated by reflection of the light from the magnetic recording medium.

3. The system of claim 1, wherein the magnetic recording medium is magnetic tape.

4. The system of claim 1, wherein the magnetic recording medium is a magnetic disk.

5. The system of claim 1 further comprising a lens positioned between the light source and the magnetic recording medium, wherein the lens further directs the light upon the magnetic recording medium.

6. The system of claim 1, wherein the detector is configured to generate a signal as a function of the part of the diffraction pattern detected by the detector.

7. The system of claim 6 further comprising a processor coupled to the detector, the processor being configured to receive the signal from the detector and generate an output signal as a function of the signal from the detector.

8. The system of claim 7 further comprising an output device coupled to the processor, the output device configured to receive the output signal and to display data as a function of the output signal.

9. The system of claim 7, wherein the light illuminates a region of the magnetic recording medium, the apparatus further comprising a position sensor coupled to the processor, the position sensor supplying a position signal to the processor as a function of the illuminated region of the magnetic recording medium,
    wherein the processor is further configured to receive the position signal and to generate the output signal as a function of the position signal.

10. The system of claim 9 further comprising a transporting mechanism configured to move at least one of the magnetic recording medium and the light source to change the region of the magnetic recording medium being illuminated.

11. The system of claim 7 further comprising:
    a marking device configured to form servo tracks on the magnetic recording medium, the servo tracks being physical marks on the surface of the magnetic recording medium;
    a controller coupled to the marking device that receives the output signal generated by the processor and generates a control signal,
    wherein the marking device is further configured to form servo tracks on the magnetic recording medium as a function of the control signal.

12. The system of claim 1, wherein the detector is configured to detect a single diffractive order of the diffraction pattern.

13. The system of claim 12, wherein the detector is a first detectors, wherein the signal is a first signal, and wherein the diffractive order is a first diffractive order, the apparatus further comprising:
    a second detector configured to detect a second single diffractive order of the diffraction pattern, the second diffractive order detected by the second detector being different from the first diffractive order detected by the first detector; and
    a processor coupled to the first and second detectors, the processor configured to receive the first and second signals and to generate an output signal as a function of the first and second signals.

14. The system of claim 1, wherein the detector comprises a photodiode.

15. The system of claim 1, wherein the light source is a laser.

16. The system of claim 1, wherein the physical marks on the surface of the magnetic recording medium comprise servo tracks.

17. A method comprising:
    illuminating a surface of a magnetic recording medium having at least two physical marks to generate a diffraction pattern comprising at least two diffractive orders; and
    detecting at least part of the diffraction pattern.

18. The method of claim 17 further comprising illuminating the surface of the magnetic recording medium with a laser.

19. The method of claim 17, wherein detecting at least part of the diffraction pattern comprises detecting a single diffractive order of the diffraction pattern.

20. The method of claim 19 further comprising generating a signal as a function of the detected diffraction pattern.

21. The method of claim 20, wherein the signal is a first signal and wherein the diffractive order is a first diffractive order, the method further comprising:
    detecting a second single diffractive order, the second diffractive order being different from the first diffractive order; and
    generating a second signal as a function of the intensity of first and second diffractive orders.

22. The method of claim 21, wherein the second signal is a function of the relative intensity of the first and second diffractive orders.

23. The method of claim 20, wherein the signal is a first signal, the method further comprising:

sensing the illuminated region of the magnetic recording medium;

generating a second signal as function of the position of the illuminated region of the magnetic recording medium; and generating a third signal as a function of the first and second signals.

24. The method of claim 17 further comprising changing the position of the illuminated region of the magnetic recording medium.

25. The method of claim 17 further comprising comparing the signal to a preselected value.

26. A method comprising:

forming servo tracks on a magnetic recording medium, the servo tracks defining at least two physical marks on a surface of the magnetic recording medium;

illuminating a region of the magnetic recording medium to generate a diffraction pattern comprising at least two diffractive orders;

detecting at least part of the diffraction pattern;

generating a signal as a function of the detected diffraction pattern; and forming subsequent servo tracks on the magnetic recording medium as a function of the signal.

27. The method of claim 26, wherein generating a signal as a function of the detected diffraction pattern comprises:

comparing the detected diffraction pattern to a target diffraction pattern; and generating the signal as a function of the difference between the detected diffraction pattern and the target diffraction pattern.

28. A system comprising:

a marking device configured to form servo tracks on a magnetic recording medium, the servo tracks being physical marks on the surface of the magnetic recording medium;

a light source configured to direct light upon the magnetic recording medium and generate a diffraction pattern comprising at least two diffractive orders; and a light detector configured to detect at least part of the diffraction pattern, and to generate a signal as a function of the detected diffraction pattern, wherein the marking device is further configured to form subsequent servo tracks on the magnetic recording medium as a function of the signal.

29. The system of claim 28, wherein the light source comprises a laser.

30. The system of claim 28, wherein the marking device comprises a laser.

31. The system of claim 28, wherein the light detector comprises a photodiode.

32. The system of claim 28 further comprising a transporting mechanism configured to move the magnetic recording medium.

33. The system of claim 28, wherein the signal is a first signal, the apparatus further comprising a processor coupled to the light detector and to the marking device, the processor configured to receive the first signal and to generate a second signal.

34. The system of claim 33, wherein the processor is further configured to compare the first signal to a preselected value, and wherein the second signal is a function of the difference between the first signal and the preselected value.

35. A method, comprising:

illuminating a surface of a magnetic recording medium having at least two servo tracks to generate a diffraction pattern comprising at least two diffractive orders;

detecting at least part of the diffraction, pattern; and generating a signal as a function of the detected diffraction pattern.

36. The method of claim 35, wherein the signal is a function of at least one of the width of the servo tracks, the depth of the servo tracks, the spacing of the servo tracks, the cross-sectional shape of the servo tracks and the uniformity of the servo tracks.

37. The method of claim 35 further comprising displaying data as a function of the signal.

* * * * *